US009636836B2

(12) United States Patent
Pierce et al.

(10) Patent No.: US 9,636,836 B2
(45) Date of Patent: May 2, 2017

(54) PIVOTAL TOOL SUPPORT FOR A PIPE MACHINING APPARATUS

(71) Applicant: ILLINOIS TOOL WORKS INC., Glenview, IL (US)

(72) Inventors: Kenneth R. Pierce, Arlington Heights, IL (US); Michael W. Gearhart, Prospect Heights, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 207 days.

(21) Appl. No.: 14/504,728

(22) Filed: Oct. 2, 2014

(65) Prior Publication Data

US 2015/0096421 A1    Apr. 9, 2015

Related U.S. Application Data

(60) Provisional application No. 61/886,321, filed on Oct. 3, 2013.

(51) Int. Cl.
*B23B 5/08* (2006.01)
*B26D 7/00* (2006.01)
(Continued)

(52) U.S. Cl.
CPC ........... *B26D 7/0006* (2013.01); *B23D 21/04* (2013.01); *B23B 5/08* (2013.01); *B23B 5/161* (2013.01);
(Continued)

(58) Field of Classification Search
CPC . Y10T 82/22; Y10T 82/2522; Y10T 82/2527; B23B 5/08; B23B 5/161; B23B 2215/12; B23B 3/22; B23Q 1/70
See application file for complete search history.

(56) References Cited

U.S. PATENT DOCUMENTS 190,115 A    5/1877   Babcock et al.
768,128 A    5/1904   Jackson
(Continued)

FOREIGN PATENT DOCUMENTS

CN    2126125 U    12/1992
CN    2475496 Y    2/2002
(Continued)

OTHER PUBLICATIONS

E.H. Wachs, SDB 412/2 Small Diameter Beveler Portable Pipe & Tube Prepping Machine, Sales Brochure, published at least as early as Oct. 11, 2011, 2 pages, E.H. Wachs Company, Lincolnshire, Illinois Has manual axial feed.
(Continued)

*Primary Examiner* — Daniel Howell
*Assistant Examiner* — Nicole N Ramos
(74) *Attorney, Agent, or Firm* — Klintworth & Rozenblat IP LLC

(57) ABSTRACT

In one aspect, a tool support for a pipe machining apparatus includes a support arm defining a groove therein and configured to support a tool, and a guide member at least partially positioned in the groove to allow movement of the support arm in a first direction and inhibit movement of the support arm in a second direction. In one aspect, a tool support includes a one-piece unitarily formed body member defining a cavity there through, and a tool support arm at least partially positioned in the cavity and configured to translate within the cavity. In one aspect, a tool support includes a first translating member configured to translate a tool toward and away from a pipe, and a second translating member configured to translate the tool toward and away from the pipe. The second translating member is coupled to and moveable relative to the first translating member.

17 Claims, 8 Drawing Sheets

(51) Int. Cl.
  *B23D 21/04* (2006.01)
  *B23Q 1/70* (2006.01)
  *B23B 5/16* (2006.01)

(52) U.S. Cl.
  CPC .................. *B23Q 1/70* (2013.01); *Y10T 82/22* (2015.01); *Y10T 82/2522* (2015.01); *Y10T 83/8889* (2015.04)

(56) References Cited

U.S. PATENT DOCUMENTS

| | | | |
|---|---|---|---|
| 1,074,334 | A | 9/1913 | Vosper |
| 1,097,152 | A | 5/1914 | Wagner |
| 1,140,208 | A | 5/1915 | Taylor |
| 1,225,209 | A * | 5/1917 | Beaulieu ............. B23B 31/1071 279/105.1 |
| 1,323,092 | A | 11/1919 | Palmer |
| 2,000,772 | A | 5/1935 | McGill |
| 2,147,438 | A | 2/1939 | Hassler |
| 2,257,619 | A | 9/1941 | Prill |
| 2,346,373 | A | 1/1942 | Fortier |
| 2,275,327 | A | 3/1942 | Severson |
| 2,291,395 | A | 7/1942 | Levey |
| 2,358,741 | A | 9/1944 | Shelby |
| 2,364,963 | A | 12/1944 | Elliott |
| 2,446,026 | A | 2/1946 | Ruby |
| 2,429,375 | A | 10/1947 | Smith |
| 2,567,833 | A | 9/1951 | Warren et al. |
| 2,600,481 | A | 6/1952 | Clyde |
| 2,635,270 | A | 4/1953 | Dawson |
| 2,705,515 | A | 4/1955 | Walker |
| 2,763,257 | A | 9/1956 | Asbury |
| 2,769,468 | A | 11/1956 | Swanson |
| 2,962,745 | A | 12/1960 | Pedersen |
| 3,071,903 | A | 1/1963 | Wing et al. |
| 3,078,547 | A | 2/1963 | Sweet |
| 3,135,850 | A | 6/1964 | Scheiler et al. |
| 3,371,567 | A | 3/1968 | Davis |
| 3,455,002 | A | 7/1969 | Miller |
| 3,732,618 | A | 5/1973 | Lorenz |
| 3,732,758 | A | 5/1973 | Rinaldo |
| 3,852,917 | A | 12/1974 | McKown |
| 3,893,356 | A | 7/1975 | Atzberger |
| 3,919,717 | A | 11/1975 | Cullen et al. |
| 4,007,705 | A | 2/1977 | Sherer et al. |
| 4,043,167 | A | 8/1977 | Koser |
| 4,086,732 | A | 5/1978 | Ramsey |
| 4,091,514 | A | 5/1978 | Motes-Conners et al. |
| 4,092,758 | A | 6/1978 | Horton et al. |
| 4,103,461 | A | 8/1978 | Besenbruch |
| 4,111,083 | A | 9/1978 | Carter |
| 4,143,489 | A | 3/1979 | Sogner |
| 4,149,436 | A | 4/1979 | Blattler |
| 4,205,694 | A | 6/1980 | Thompson et al. |
| 4,207,786 | A | 6/1980 | Astle et al. |
| 4,211,510 | A * | 7/1980 | Hopkins ........... B23B 29/03428 279/103 |
| 4,217,061 | A * | 8/1980 | Eiland ...................... F16D 1/04 403/313 |
| 4,318,391 | A | 3/1982 | Wachs et al. |
| 4,402,136 | A | 9/1983 | Rast |
| 4,411,178 | A | 10/1983 | Wachs et al. |
| 4,421,441 | A | 12/1983 | Hirose |
| 4,437,366 | A | 3/1984 | Astle |
| 4,445,248 | A | 5/1984 | Hait |
| 4,483,223 | A | 11/1984 | Nall et al. |
| 4,490,909 | A | 1/1985 | Wachs et al. |
| 4,543,861 | A | 10/1985 | Kwech et al. |
| 4,552,594 | A | 11/1985 | van Voskuilen et al. |
| 4,614,136 | A | 9/1986 | Pertle |
| 4,637,285 | A | 1/1987 | Mizoguchi |
| 4,640,159 | A | 2/1987 | Stojanovski |
| 4,655,108 | A | 4/1987 | Galos |
| 4,677,884 | A | 7/1987 | Kwech et al. |
| 4,739,685 | A | 4/1988 | Ricci |
| 4,750,392 | A | 6/1988 | Hong |
| 4,762,038 | A | 8/1988 | Olson |
| 4,770,074 | A | 9/1988 | Kwech |
| 4,791,842 | A | 12/1988 | Olson |
| 4,823,655 | A | 4/1989 | VanderPol |
| 4,825,543 | A | 5/1989 | Thalmann |
| 4,880,340 | A | 11/1989 | Taki et al. |
| 4,930,542 | A | 6/1990 | Winkle et al. |
| 4,936,718 | A | 6/1990 | Proffitt |
| 4,939,964 | A | 7/1990 | Ricci |
| 4,944,205 | A | 7/1990 | Ricci |
| 4,981,055 | A | 1/1991 | VanderPol et al. |
| 5,002,440 | A | 3/1991 | Tamaoki et al. |
| 5,013,015 | A | 5/1991 | Fatheree |
| 5,050,291 | A | 9/1991 | Gilmore |
| 5,054,342 | A | 10/1991 | Swiatowy |
| 5,063,799 | A * | 11/1991 | Brewer ................... B23B 29/04 82/158 |
| 5,070,654 | A | 12/1991 | Manqvist et al. |
| 5,070,656 | A | 12/1991 | Brogden |
| 5,096,327 | A * | 3/1992 | Ruland ..................... B23Q 1/28 24/279 |
| 5,119,703 | A | 6/1992 | Ruby |
| 5,136,969 | A | 8/1992 | Chapman |
| 5,199,226 | A | 4/1993 | Rose |
| 5,199,928 | A | 4/1993 | Gress et al. |
| 5,211,212 | A | 5/1993 | Carlson |
| 5,244,505 | A | 9/1993 | Allison et al. |
| 5,287,661 | A | 2/1994 | Benner |
| 5,309,620 | A | 5/1994 | Shinohara et al. |
| 5,368,399 | A | 11/1994 | Tremblay |
| 5,429,021 | A | 7/1995 | Astle et al. |
| 5,482,410 | A | 1/1996 | Chambers |
| 5,496,206 | A | 3/1996 | Young |
| 5,549,024 | A | 8/1996 | Ricci |
| 5,570,608 | A | 11/1996 | Miller |
| 5,615,696 | A | 4/1997 | Lawler |
| 5,616,068 | A | 4/1997 | Soderberg |
| 5,628,675 | A | 5/1997 | Brown et al. |
| 5,642,969 | A | 7/1997 | Strait |
| 5,762,545 | A | 6/1998 | Edwards |
| 5,775,188 | A | 7/1998 | Strait |
| 5,778,746 | A | 7/1998 | Keller |
| 5,894,772 | A | 4/1999 | Nodar |
| 5,954,362 | A | 9/1999 | Aota et al. |
| 5,954,462 | A | 9/1999 | Way et al. |
| 3,038,947 | A | 3/2000 | Tremblay |
| 6,050,161 | A | 4/2000 | Tremblay |
| 6,065,378 | A | 5/2000 | Ricci |
| 6,189,425 | B1 | 2/2001 | Ricci et al. |
| 6,200,073 | B1 | 3/2001 | Chung |
| 6,200,078 | B1 | 3/2001 | Kubota |
| 6,202,522 | B1 | 3/2001 | Tremblay |
| 6,241,590 | B1 | 6/2001 | Heijkenskjold |
| 6,257,110 | B1 | 7/2001 | Ricci et al. |
| 6,347,914 | B1 | 2/2002 | Boyle et al. |
| 6,427,567 | B1 | 8/2002 | Ricci et al. |
| 6,453,899 | B1 | 9/2002 | Tselesin |
| 6,539,778 | B2 | 4/2003 | Tucker et al. |
| 6,619,164 | B1 | 9/2003 | Ricci |
| 6,709,206 | B1 | 3/2004 | Andes et al. |
| 6,854,367 | B2 * | 2/2005 | Ericksson ............... B23B 29/04 279/5 |
| 6,880,832 | B2 * | 4/2005 | DeRosa ................ B23B 31/103 279/43.1 |
| 6,966,731 | B2 | 11/2005 | VanderPol et al. |
| 6,994,002 | B2 | 2/2006 | Moruzzi |
| 7,140,812 | B2 | 11/2006 | Bryan |
| 7,267,035 | B2 | 9/2007 | Uebelhart |
| 7,270,505 | B2 | 9/2007 | VanderPol et al. |
| 7,320,268 | B2 | 1/2008 | Kawashima |
| 7,337,698 | B2 | 3/2008 | DiBiase |
| 7,383,758 | B2 | 6/2008 | Place et al. |
| 7,510,462 | B2 | 3/2009 | Bryan |
| 7,690,970 | B2 | 4/2010 | Palushaj |
| 7,757,591 | B2 | 7/2010 | Trice |
| 7,793,574 | B2 | 9/2010 | Sorensen et al. |
| 8,043,144 | B2 | 10/2011 | Palushaj |
| 8,186,249 | B2 | 5/2012 | Sasu |

(56) References Cited

U.S. PATENT DOCUMENTS

| | | |
|---|---|---|
| 8,250,953 B2 | 8/2012 | Hall et al. |
| 8,616,078 B2 | 12/2013 | Matsumoto et al. |
| 2002/0003173 A1 | 1/2002 | Bauer et al. |
| 2003/0106397 A1 | 6/2003 | Ricci et al. |
| 2003/0172484 A1 | 9/2003 | Lendabarker |
| 2004/0035171 A1 | 2/2004 | Gormany |
| 2004/0234352 A1 | 11/2004 | Vanderpol |
| 2005/0132851 A1 | 6/2005 | Place |
| 2005/0155471 A1 | 7/2005 | Ricci |
| 2005/0257431 A1 | 11/2005 | Yamaguchi |
| 2006/0092674 A1 | 5/2006 | Belton |
| 2006/0207395 A1 | 9/2006 | Place |
| 2008/0135232 A1 | 6/2008 | Lawler et al. |
| 2009/0229431 A1 | 9/2009 | Ricci et al. |
| 2010/0154153 A1 | 6/2010 | Hooper et al. |
| 2010/0162860 A1 | 7/2010 | Hall et al. |
| 2010/0166516 A1 | 7/2010 | Karow |
| 2010/0203814 A1 | 8/2010 | Palushaj |
| 2011/0041658 A1 | 2/2011 | Weinberg |
| 2011/0083537 A1 | 4/2011 | Place |
| 2012/0152521 A1 | 6/2012 | Akkerman et al. |
| 2013/0109282 A1 | 5/2013 | Lewkoski et al. |
| 2013/0152748 A1 | 6/2013 | Wokan et al. |
| 2014/0096662 A1 | 4/2014 | Coakley |

FOREIGN PATENT DOCUMENTS

| | | |
|---|---|---|
| CN | 1562545 A | 1/2005 |
| CN | 2761329 Y | 3/2006 |
| CN | 201008978 Y | 1/2008 |
| CN | 101384393 A | 3/2009 |
| DE | 900042 C | 12/1953 |
| DE | 1715114 U | 1/1956 |
| DE | 2439852 A | 4/1976 |
| DE | 3603618 C1 | 10/1987 |
| DE | G9408721.0 | 5/1994 |
| DE | 29721223 U1 | 4/1998 |
| DE | 10020393 A1 | 2/2001 |
| DE | 10 2007 013503 A1 | 9/2008 |
| DE | 10 2008 025716 A1 | 12/2009 |
| DE | 10 2009 005983 A1 | 7/2010 |
| DE | 102008064081 | 7/2010 |
| EP | 0353997 | 2/1990 |
| EP | 0535431 | 4/1993 |
| EP | 0687516 | 7/1995 |
| EP | 0819501 A1 | 1/1998 |
| EP | 0826467 A1 | 3/1998 |
| EP | 2165804 A2 | 3/2010 |
| FR | 2 641 487 A1 | 7/1990 |
| GB | 139326 | 3/1920 |
| GB | 818753 A | 8/1959 |
| GB | 828940 A | 2/1960 |
| GB | 2458174 | 9/2009 |
| GB | 2458174 A | 9/2009 |
| JP | 61252015 | 11/1986 |
| JP | 62259759 | 11/1987 |
| JP | 03055106 | 3/1991 |
| JP | 0551421 | 3/1993 |
| JP | 2001287113 | 10/2001 |
| NL | 8401651 A | 12/1985 |
| NL | 1 038 144 C | 1/2012 |
| WO | 0058053 | 10/2000 |
| WO | 2006060204 A2 | 6/2006 |
| WO | 2007015256 A1 | 2/2007 |
| WO | 2007/052035 A1 | 5/2007 |
| WO | 2007102744 | 9/2007 |
| WO | 2010/077346 A1 | 7/2010 |
| WO | 2012/071419 A1 | 5/2012 |
| WO | 2014/109910 A1 | 7/2014 |

OTHER PUBLICATIONS

International Search Report and Written Opinion for PCT/US2013/052384, dated Feb. 28, 2014, 18 pages.
International Search Report and Written Opinion for International Patent Application No. PCT/US2013/063023, dated Jun. 2, 2014, 16 pages.
International Search Report and Written Opinion for PCT/US2013/062999 dated Jan. 29, 2014, 12 pages.
International Search Report and Written Opinion for PCT/US2013/062987 dated Feb. 20, 2014, 11 pages.
International Search Report and Written Opinion for PCT/US2013/063007, dated Jan. 22, 2014, 14 pages.
International Search Report and Written Opinion for PCT/US2013/077718 dated Sep. 5, 2014, 14 pages.
International Search Report and Written Opinion for PCT/US2013/077721 dated Aug. 22, 2014, 19 pages.
International Search Report and Written Opinion for PCT/US2013/077719 dated Jul. 4, 2014, 18 pages.
International Search Report and Written Opinion for PCT/US2013/077802 dated May 27, 2014, 11 pages.
International Search Report and Written Opinion for PCT/US2014/058814 dated Dec. 15, 2014, 9 pages.
International Search Report and Written Opinion for PCT/US2016/020481 dated Jun. 13, 2016, 13 pages.

* cited by examiner

PIVOTAL TOOL SUPPORT FOR A PIPE MACHINING APPARATUS

RELATED APPLICATIONS

The present application claims the priority benefit of U.S. Provisional Patent Application No. 61/886,321, filed Oct. 3, 2013, the content of which is incorporated by reference herein in its entirety.

FIELD OF THE INVENTION

The present disclosure generally relates to pipe machining apparatuses and, more particularly, to tool supports for split frame pipe machining apparatuses.

BACKGROUND

A variety of different types of pipe machining apparatuses exist to perform various machining processes on pipes, such as, for example, cutting pipes. One example of such pipe machining apparatuses includes a split frame pipe machining apparatus, which includes two or more frame members that surround the pipe from respective sides and couple together around the pipe. Such a pipe cutter includes a tool or cutting device that encircles the pipe and moves toward the pipe in small increments during the cutting process in order to slowly cut into the pipe. The tool is supported by a tool support. Eventually, after many small increments of adjustment toward the pipe, the pipe will be completely cut by the tool.

SUMMARY

The present disclosure is defined by the following claims, and nothing in this section should be taken as a limitation on those claims.

In one aspect, a tool support for a pipe machining apparatus is provided. The tool support includes a support arm defining a groove therein, a tool supported by the support arm, and a guide member at least partially positioned in the groove to allow movement of the support arm in a first direction and inhibit movement of the support arm in a second direction.

In one aspect, the first direction is translation of the support arm along a longitudinal axis of the support arm and the second direction is rotation of the support arm.

In one aspect, the groove is V-shaped and the guide member has a complementary V-shaped.

In one aspect, the tool support is a pivotal tool support.

In one aspect, a tool support for a pipe machining apparatus is provided. The tool support includes a one-piece unitarily formed body member defining a cavity there through, a support arm at least partially positioned in the cavity and configured to translate within the cavity, and a tool supported by the support arm.

In one aspect, the tool support is a pivotal tool support.

In one aspect, the body member includes an adjustable portion configured to adjust a size of the cavity.

In one aspect, the cavity includes a first section and a second section. The first section may have a fixed size and the second section may have an adjustable size.

In one aspect, the body member includes an adjustable portion configured to adjust a size of the second section of the cavity.

In one aspect, the adjustable portion includes a first resilient member and a second resilient member selectively moveable relative to one another to adjust the size of the second section of the cavity.

In one aspect, the tool support further includes a first member configured to move the first resilient member and the second resilient member toward one another to reduce the size of the second section of the cavity and a second member configured to move the first resilient member and the second resilient member away from one another to increase the size of the second section of the cavity.

In one aspect, a tool support for a pipe machining apparatus is provided. The tool support includes a first translating member configured to translate a tool toward and away from a pipe and a second translating member configured to translate the tool toward and away from the pipe. The second translating member is coupled to and moveable relative to the first translating member.

In one aspect, a tool support for a pipe machining apparatus is provided and includes a support arm defining a groove therein and configured to support a tool, and a guide member at least partially positioned in the groove to allow movement of the support arm in a first direction and inhibit movement of the support arm in a second direction.

In one aspect, the first direction is translation of the support arm along a longitudinal axis of the support arm and the second direction is rotation of the support arm about the longitudinal axis.

In one aspect, the groove is V-shaped and the guide member has a complementary V-shaped.

In one aspect, the tool support is a pivotal tool support.

In one aspect, the guide member is moveable to adjust a depth the guide member extends into the groove.

In one aspect, the tool support further includes an adjustable mechanism useable with the guide member to adjust the depth the guide member extends into the groove.

In one aspect, the tool support further includes a body member defining a cavity there through and a receptacle in communication with the cavity. The support arm may be positioned in the cavity and moveable relative to the body member in the first direction, and the guide member may be at least partially positioned in the receptacle and extends into the cavity to be at least partially positioned in the groove.

In one aspect, the body member includes an adjustable portion configured to adjust a size of the cavity. The adjustable portion may be moveable to provide a first size of the cavity, in which the adjustable portion engages the support arm to secure the support arm to the body member and inhibit movement of the support arm in the first direction, and a second size of the cavity, in which the support arm is moveable relative to the body member in the first direction. The second size is larger than the first size.

In one aspect, a tool support for a pipe machining apparatus is provided and includes a one-piece unitarily formed body member defining a cavity there through, and a tool support arm at least partially positioned in the cavity and configured to translate within the cavity.

In one aspect, the tool support is a pivotal tool support.

In one aspect, the body member includes an adjustable portion configured to adjust a size of the cavity.

In one aspect, the cavity includes a first section and a second section, wherein the first section has a fixed size and the second section has an adjustable size.

In one aspect, the body member includes an adjustable portion configured to adjust a size of the second section of the cavity.

In one aspect, the adjustable portion includes a first resilient member and a second resilient member selectively moveable relative to one another to adjust the size of the second section of the cavity.

In one aspect, the tool support further includes a first member configured to move the first resilient member and the second resilient member toward one another to reduce the size of the second section of the cavity and a second member configured to move the first resilient member and the second resilient member away from one another to increase the size of the second section of the cavity.

In one aspect, the body member defines a receptacle in communication with the cavity. The tool support further includes a guide member at least partially positioned in the receptacle and extending into the cavity where the guide member engages the tool support arm to allow movement of the tool support arm in a first direction and to inhibit movement of the tool support arm in a second direction different than the first direction.

In one aspect, a tool support for a pipe machining apparatus is provided and includes a first translating member configured to translate a tool toward and away from a pipe, and a second translating member configured to translate the tool toward and away from the pipe. The second translating member may be coupled to and moveable relative to the first translating member.

In one aspect, the tool support further includes a locking member that selectively rigidly secures the second translating member to the first translating member. The locking member may be moveable between a first position, in which the first and second translating members are rigidly secured together and are not moveable relative to each other, and a second position, in which the first and second translating members are moveable relative to each other.

In one aspect, the tool support further includes a locking member configured to selectively secure the first and second translating members to one another to selectively inhibit or allow movement of the second translating member relative to the first translating member, and an engagement member coupled to the first translating member to translate the first translating member relative to the pipe.

In one aspect, the first translating member is configured to translate a tool during a machining operation of the pipe machining apparatus and the second translating member is configured to translate a tool at least one of prior to or subsequent to a machining operation.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 2:
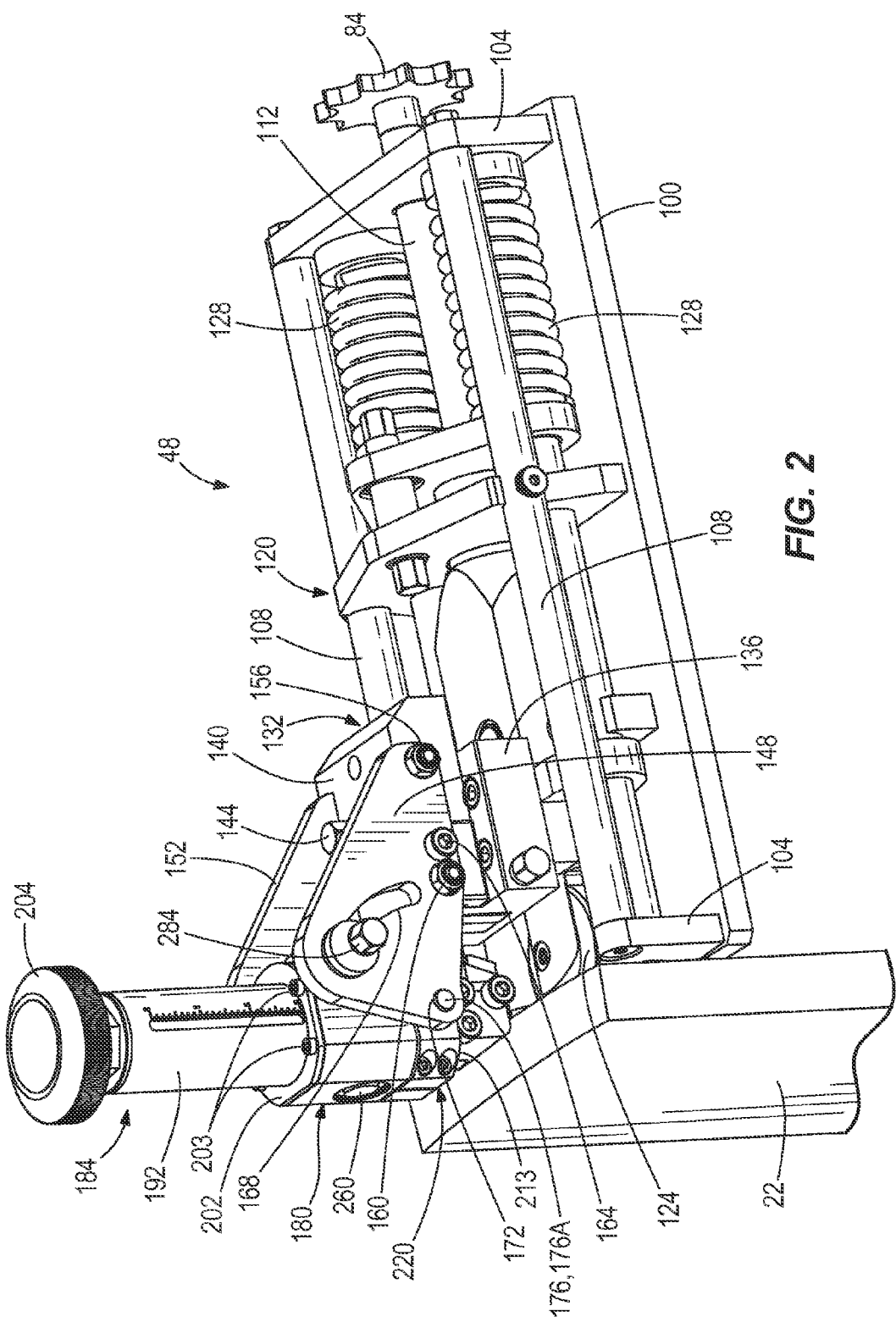
FIG. 2 is a perspective view of another example of a tool support and a portion of a pipe to be machined with a tool supported by the tool support shown in a first position, according to one aspect of the present disclosure.
Figure 3:
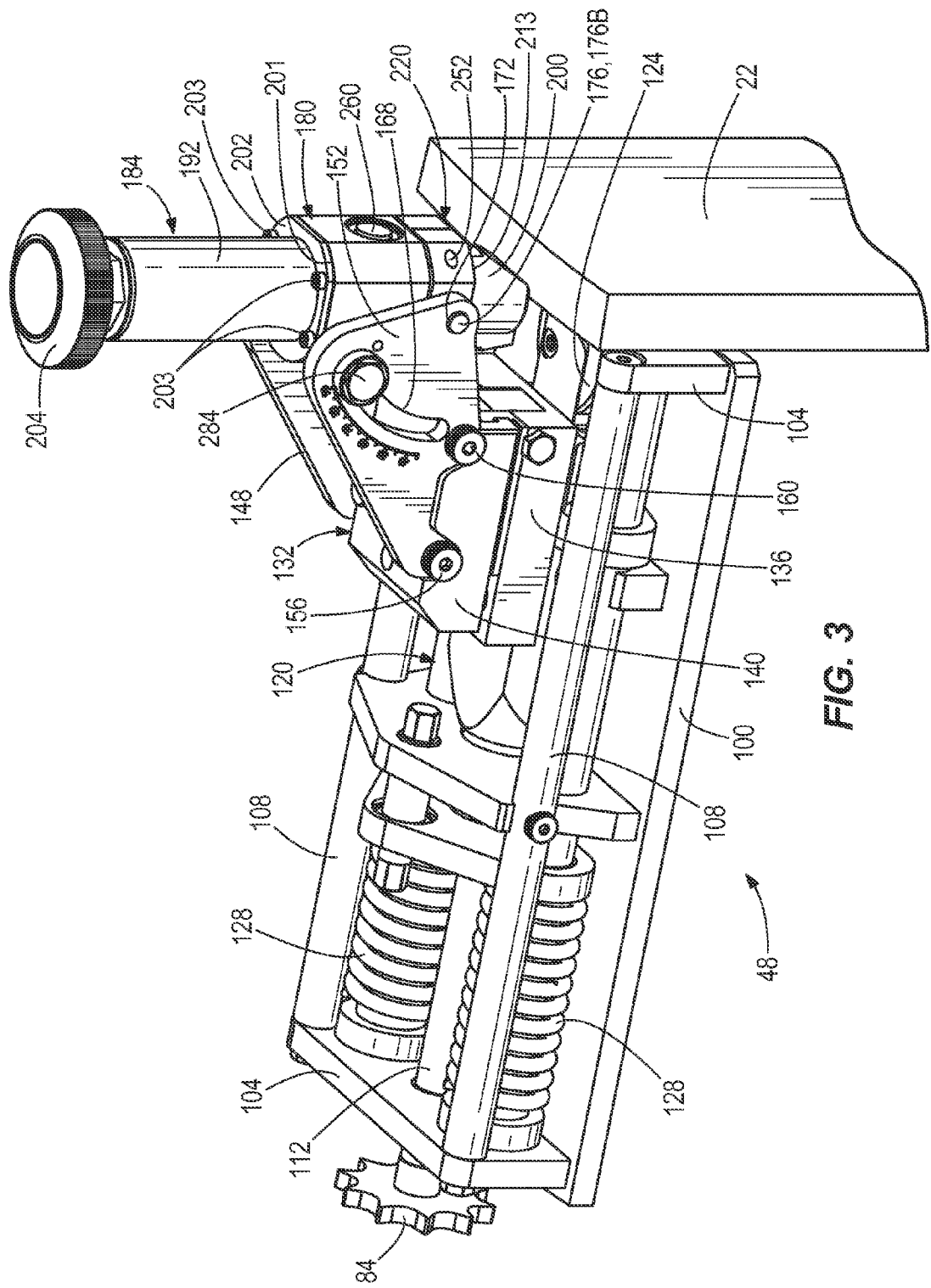
FIG. 3 is another perspective view of the tool support shown in FIG. 2, according to one aspect of the present disclosure.

Referring to FIGS. 2 and 3, one example of a tool support 48 in accordance with the present disclosure is illustrated. The tool support 48 may be included in a pipe machining apparatus 20 configured to machine a pipe 22. The tool support 48 may be included with any type of pipe machining apparatus capable of machining any size pipe, and all of such possibilities are intended to be within the spirit and scope of the present disclosure.

Figure 1:
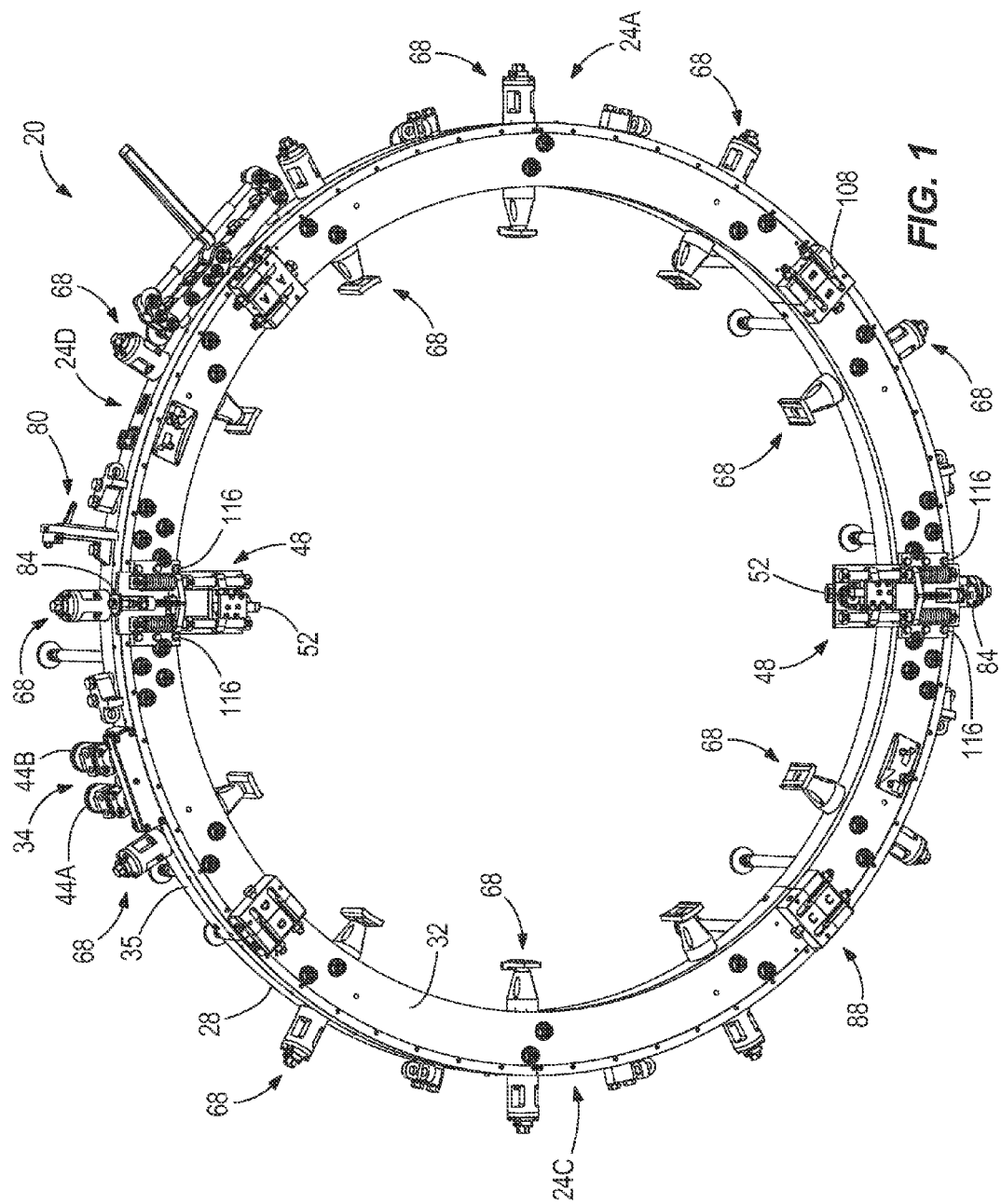
FIG. 1 is a perspective view of one example of a pipe machining apparatus including one example of a tool support, according to one aspect of the present disclosure.

With reference to FIG. 1, one example of a pipe machining apparatus 20 adapted to machine pipes of varying diameters is illustrated. This example of a pipe machining apparatus 20 is configured to include the tool support 48 shown in FIGS. 2 and 3. In some exemplary embodiments, the apparatus 20 completely cuts through pipes 22. In other exemplary embodiments, the apparatus 20 prepares an end of a pipe for coupling to another pipe. In still other exemplary embodiments, the apparatus 20 both completely cuts and prepares a pipe for coupling to another pipe. The illustrated example of a pipe machining apparatus 20 is only one type of a wide variety of pipe machining apparatuses that may employ the features of the present disclosure and the illustrated example is not intended to limit the present disclosure in any manner.

In the illustrated example, pipe machining apparatus 20 is formed of four joined-together sections 24A, 24B, 24C, 24D and includes a frame 28 and a tool carrier 32. The four joined together sections 24A, 24B, 24C, 24D together comprise the frame 28 and the tool carrier 32. A drive mechanism 34 is coupled to a periphery 35 of the frame 28. In the illustrated example, the drive mechanism 34 includes a pair of drive motors 44A, 44B such as, for example, an air motor with suitable gear reduction means. In other examples, the drive mechanism 34 may be comprised of other quantities of motors or other types of drive mechanisms. The frame 28 is adapted to couple and be fixed relative to a pipe, and the tool carrier 32 is rotatable relative to the fixed frame 28 and the pipe. The drive mechanism 34 is adapted to rotate the tool carrier 32 relative to the frame 28 through a gear train.

The rotatable tool carrier 32 includes one or more tool supports 48 (two tool supports 48 shown in the illustrated example), which support tools 52 for performing a cutting or machining operation on the pipe as the tools 52 rotate circumferentially about the pipe 22. Both tool supports 48 illustrated in FIG. 1 are the same type of tool support and are one example of many different types of tool supports of the present disclosure. The tool support 48 illustrated in FIGS. 2 and 3 is mountable to the pipe machining apparatus 20 in a similar location and in a similar manner to the example illustrated in FIG. 1. The tool supports 48 are coupled to the tool carrier 32 by a plurality of fasteners 116. The machining operation performed by the tool(s) 52 may form a straight edge substantially perpendicular to a longitudinal extent of the pipe 22, a bevel on an end of the pipe 22 that is transverse to and at an angle other than ninety-degrees to the longitudinal extent of the pipe 22, or an edge of a pipe 22 having any angle. Such a bevel may be formed on either an inner surface of the pipe 22 or an outer surface of the pipe 22.

The apparatus 20 further includes a plurality of coupling members 68 engageable with an exterior of the pipe 22 and having suitable adjustability to couple and concentrically or axially locate the apparatus 20 to the exterior of the pipe 22. The coupling members 68 are also positionable on the apparatus 20 to engage an interior of the pipe 22 and are suitably adjustable to couple and concentrically or axially locate the apparatus 20 to the interior of the pipe 22.

Tool carrier 32 is rotatably mounted on and supported by frame 28 by a plurality of roller bearings positioned between the frame 28 and the tool carrier 32. The roller bearings ride in a circular bearing race on the interior of tool carrier 32.

The apparatus 20 also includes an advancement mechanism 80 that is adjustable into and out of a path of an advancement member 84 coupled to each tool support 48 to advance the tool 52 toward the pipe 22.

Figure 4:
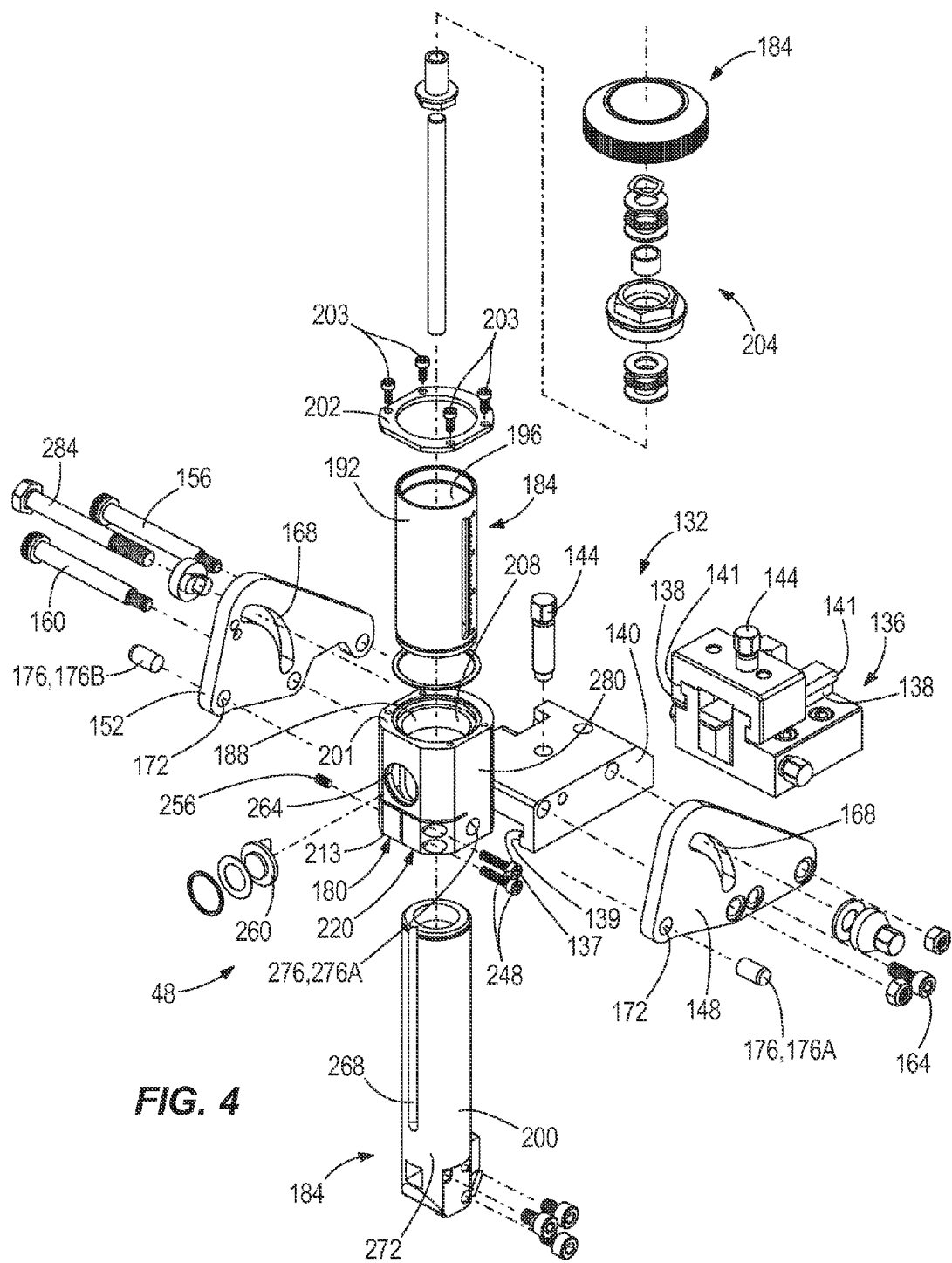
FIG. 4 is an exploded view of a portion of the tool support shown in FIG. 2, according to one aspect of the present disclosure.

With continued reference to FIG. 1 and further reference to FIGS. 2-4, the example of the tool support 48 illustrated in FIGS. 2-4 will be described in more detail. In this example, the tool support 48 includes a base 100 coupled to the tool carrier 32, end plates 104 extending from the base 100 and defining apertures therein for supporting support rods 108 extending between the end plates 104, an engagement member 84 that is rotatable and configured to engage the advancement mechanism 80 for advancing the tool 52, a shaft 112 coupled to and rotatable with the engagement member 84, a first translating member 120 threadably coupled to the shaft 112 and configured to move or linearly translate toward and away from the pipe 22 depending on directional rotation of the shaft 112, a roller 124 coupled to the first translating member 120 and configured to engage an outer surface of the pipe 22 to roll against the pipe 22 and guide the tool support 48 along the outer surface of the pipe 22, a pair of biasing members 128 biasing the first translating member 120 toward the pipe 22.

Figure 5:
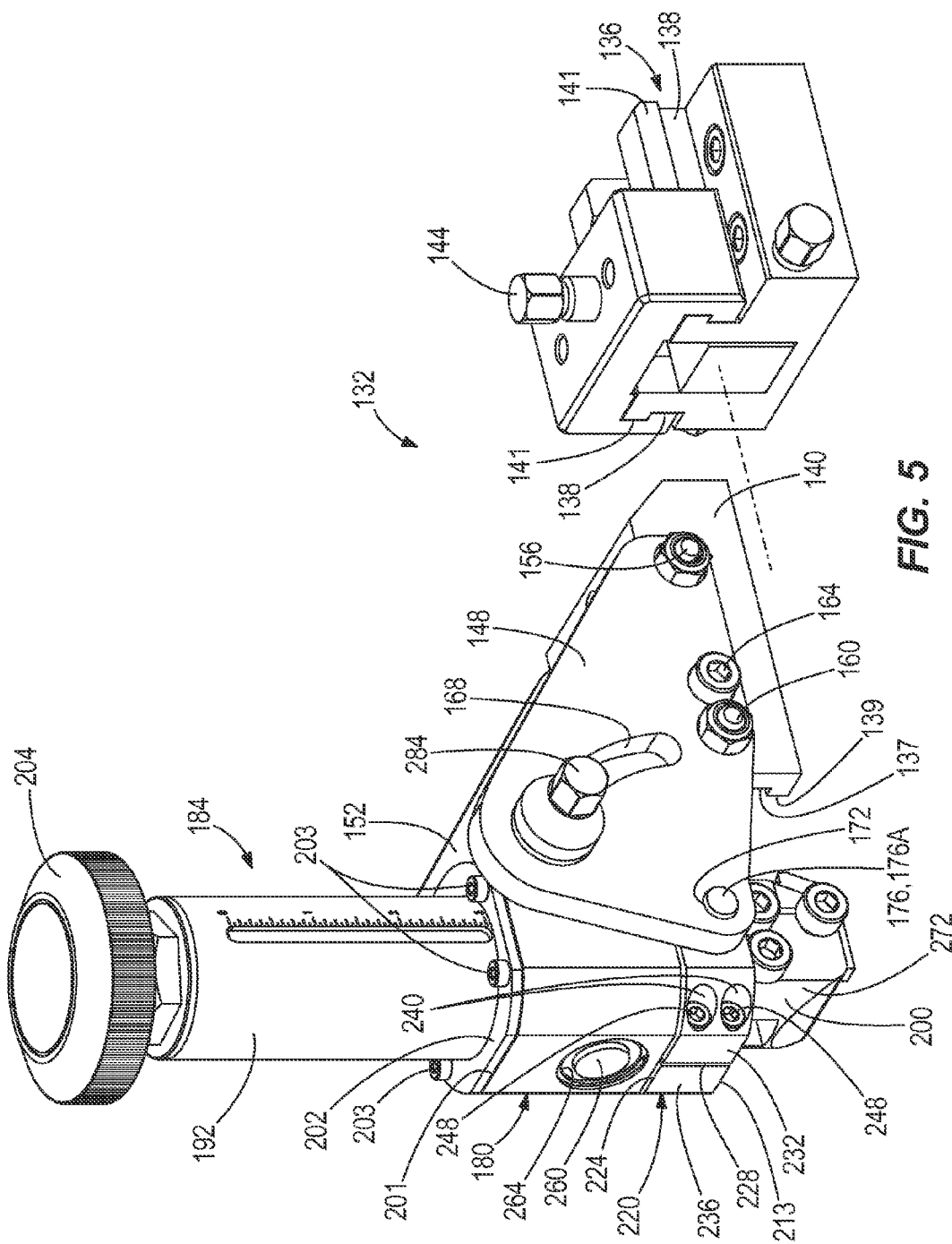
FIG. 5 is a partially exploded view of a portion of the tool support shown in FIG. 2, according to one aspect of the present disclosure.
Figure 6:
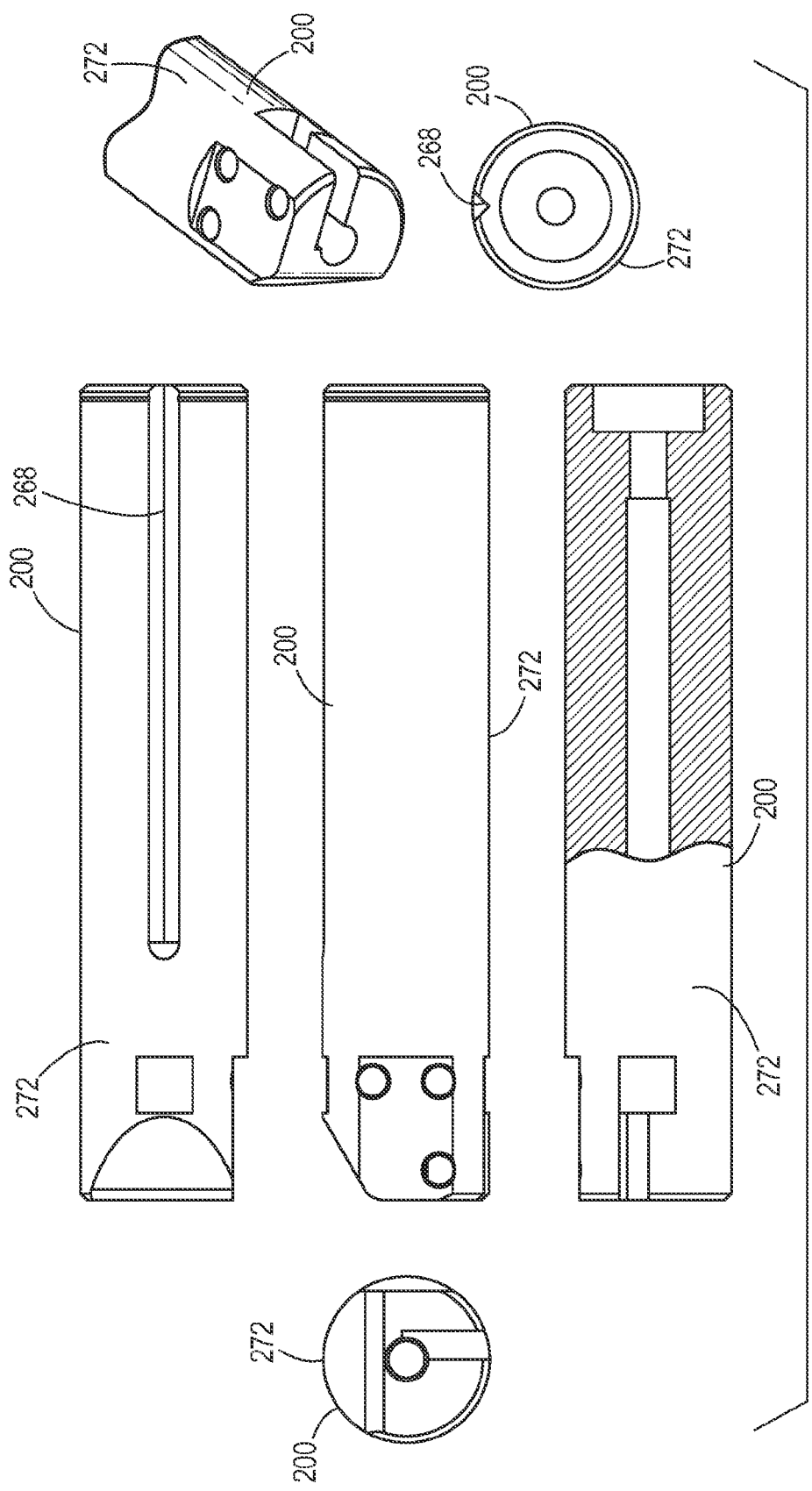
FIG. 6 is a plurality of views of a support arm of the tool support shown in FIG. 2, according to one aspect of the present disclosure.

With continued reference to FIGS. 1-4 and additional reference to FIG. 5, the tool support 48 also includes a second translating member 132 including a base 136 rigidly coupled to the first translating member 120 via coupling members (e.g., fasteners) and a slide member 140 slidably coupled to the base 136. The base 136 and slide member 140 have complementary shaped recesses 137, 138 and lips 139, 141 that mesh with each other to allow sliding or translating relative to each other, but inhibit the base 136 and slide member 140 from pulling away from each other in a direction corresponding to, parallel to, or linear to a longitudinal central axis of the pipe 22. The slide member 140 may be selectively secured in place to the base 136 via one or more locking members 144, which may be tightened to inhibit movement of the slide member 140 relative to the base 136 or loosened to allow movement of the slide member 140 relative to the base 136.

The tool support 48 also includes a first plate 148 and a second plate 152 spaced-apart from one another and coupled to opposite sides of the slide member 140. The first and second plates 148, 152 are both coupled to the slide member 140 with a first coupling member 156 and a second coupling member 160. The first plate 148 is also coupled to the slide member 140 with a third coupling member 164. The plates 148, 152 are rigidly coupled to the slide member 140 such that the plates 148, 152 move with the slide member 140 relative to the base 136 of the second translating member 132. The first and second plates 148, 152 each define an arcuate slot 168 therein and a pivot aperture 172 for receiving a pivot pin 176 (described in more detail below).

With continued reference to FIGS. 1-5, the tool support 48 also includes a body member 180 and a length adjustment assembly 184 coupled to the body member 180. The body member 180 is a one-piece unitarily formed member defining a cavity 188 there through. The length adjustment assembly 184 supports the tool 52 and is configured to adjust a length or distance that the tool 52 extends from the tool support 48 to machine the pipe 22. The length adjustment assembly 184 includes a housing 192 defining a housing cavity 196, a support arm 200 positioned in the housing cavity 196 and extending out from an open end of the housing cavity 196, and an adjustment mechanism 204 coupled to the housing 192 and the support arm 200 to move the support arm 200 relative to the housing 192, thereby moving the tool 52 relative to the housing 192. The adjustment mechanism 204 adjusts the length or distance that the tool extends out of the housing 192 and away from the tool support 48. The housing 192 is coupled to an end surface 201 of the body member 180 via a plate 202 and fasteners 203, and the support arm 200 is positioned in the cavity 188 of the body member 180. The body member cavity 188 is comprised of three sections. These three sections include a first section 208 proximate the end surface 201, a second section 212 spaced from the first section 208 and positioned proximate an opposite end surface 213 of the body member 180, and a third section 216 positioned between the first section 208 and the second section 212.

The first section 208 is closely toleranced to a size of the support arm 200, but still allows translation of the support arm 200 within and relative to the first section 208 of the body member cavity 188. The third section 216, otherwise referred to as a relief section, is sized larger than the first section 208 and allows translation of the support arm 200 within and relative to the third section 216 of the body member cavity 188. The second section 212 of the body member cavity 188 is defined by an adjustable portion 220 of the body member 180.

The adjustable portion 220 is defined by a first slot 224 extending partially around a perimeter of the body member 180 between the end surfaces 201, 213 of the body member 180 and a second slot 228 extending perpendicularly to the first slot 224 (or longitudinally along the perimeter of the body member) from the opposite end surface 213 to the first slot 224. This combination of first and second slots 224, 228 provides a first resilient member 232 and a second resilient member 236 of the adjustable portion 220 that are configured to move relative to each other to adjust the size of the second section 212 of the body member cavity 188. Two apertures 240 are defined in the first resilient member 232 and are axially aligned with two apertures 244 defined in the second resilient member 236, thereby providing aligned pairs of apertures 240, 244. One coupling member 248 (e.g., fastener) is positioned in each pair of aligned apertures 240, 244 and the coupling members 248 are configured to move the first and second resilient members 232, 236 relative to each other. When the coupling members 248 are tightened, such as by threading, the first and second resilient members 232, 236 are drawn toward each other, thereby decreasing the size of the second section 212 of the body member cavity 188. When the coupling members 248 are loosened, such as by unthreading, the first and second resilient members 232, 236 move away from each other, thereby increasing the size of the second section 212 of the body member cavity 188. An additional aperture 252 is defined in the second resilient member 236 and is positioned between the two apertures 244 defined in the second resilient member 236. An adjustable member 256 (e.g., a set screw) is positioned in the additional aperture 252 and is moveable, such as by rotating, to move the adjustable member 256 toward and away from the first resilient member 232. An end of the adjustable member 256 may engage a surface of the first resilient member 232 when the adjustment member 256 is moved toward the first resilient member 232. Movement of the adjustable member 256 into engagement with and against the surface of the first resilient member 232 forces the first resilient member 232 and the second resilient member 236 away from each other. In other words, the adjustable member 256 may apply a force to the first and second resilient members 232, 236 in a direction opposite the force applied by the coupling members 248 to move the first and second resilient members 232, 236 toward one another.

Referring now to FIGS. 2-8, a guide member 260 is positioned in a receptacle 264 defined in the body member 180 and is coupled to the body member 180. In the illustrated example, the guide member 260 is coupled to the body member 180 with an adjustable mechanism that allows the guide member 260 to extend into the body member cavity 188 at different distances. The receptacle 264 is shaped to receive the guide member 260 and inhibit rotation of the guide member 260 relative to the body member 180. A groove 268 is defined in an outer surface 272 of the support arm 200 and the guide member 260 is positioned within the groove 268 to allow translation of the support arm 200 into and out of the body member 180 (along an axis extending longitudinally through centers of the body member and the support arm), but inhibit rotation of the support arm 200 relative to the body member 180. The guide member 260 and the groove 268 are complementarily shaped to ensure a closely toleranced clearance between the guide member 260 and the groove 268. This close clearance inhibits rotation of the support arm 200 relative to the body member 180, but allows controlled translation of the support arm 200 without significant resistance. The adjustable mechanism allows the guide member 260 to be appropriately positioned relative to the groove 268 and support arm 200 to achieve the desired effect. In one example, the adjustable mechanism is a shim kit. In the illustrated example, the groove 268 has a "V"-shape and the guide member 260 has a complementary wedge shape or "V"-shape that snuggly fits in the "V"-shaped groove 268. Alternatively, the groove 268 and the guide member 260 may have other complementary shapes as long as the interaction between the groove 268 and the guide member 260 allows translation of the support arm 200 into and out of the body member 180 along the longitudinal axis and inhibits rotation of the support arm 200 relative to the body member 180. In one example, the support arm 200 is made of 17-4 PH condition H900 precision ground—REF. McM #9095K25.

With continued reference to FIGS. 2-8, the body member 180 is pivotally coupled to the first and second plates 148, 152. The body member 180 defines a pivot aperture 276 and a coupling aperture 280 there through. The pivot pin 176 is positioned in the pivot aperture 276 and a coupling member 284 is positioned in the coupling aperture 280. The pivot aperture 276 is comprised of a first aperture 276A in the first resilient member 232 and a second aperture 276B defined in the second resilient member 236. The first and second apertures 276A, 276B are axially aligned with each other. The first aperture 276A is aligned with a pivot aperture 172 in the first plate 148 and the second aperture 276B is aligned with a pivot aperture 172 in the second plate 152. The pivot pin 176 is comprised of a first portion 176A and a second portion 176B. The first portion 176A is positioned in aligned first aperture 276A and pivot aperture 172 in the first plate 148, and the second portion 176B is positioned in aligned second aperture 276B and pivot aperture 172 in the second plate 152.

The coupling aperture 280 of the body member 180 is aligned with the slots 168 defined in the first and second plates 148, 152. The coupling member 284 is positioned in the aligned coupling aperture 280 and slots 168. The coupling member 284 is adjustable to selectively lock and secure the body member 180 to the first and second plates 148, 152. The coupling member 284 may be tightened, such as by threading, to secure the body member 180 to the first and second plates 148, 152 to inhibit pivoting of the body member 180 relative to the first and second plates 148, 152. Additionally, the coupling member 284 may be loosened, such as by unthreading, to uncouple or release the body member 180 from the first and second plates 148, 152, thereby allowing pivoting of the body member 180 relative to the first and second plates 148, 152. With the body member 180 uncoupled, the body member 180 pivots about the pivot pin 176 and the coupling member 284 moves in the slots 168 defined in the first and second plates 148, 152.

In operation, the tool support 48 provides great flexibility for moving the tool 52 between a variety of positions, while simultaneously rigidly and securely supporting the tool 52 in those variety of positions during operation. The tool 52 may be translated toward and away from the pipe 22 in multiple manners. This may be achieved by the first and second translating members 120, 132. One or both of the first and second translating members 120, 132 may be used to properly position the tool 52 relative to the pipe 22 for machining operation. The second translating member 132 is generally used to position the tool 52 in a desired position prior to initiating a machining operation on a pipe 22. The first translating member 120 is generally used during a machining operation to incrementally move the tool 52 toward the pipe 22.

Additionally, the tool 52 may be pivoted about the pivot pin 176 (or pivot axis) to position the tool 52 in the desired working position. The coupling member 284 may be loosened, such as by unthreading, to unsecure the body member 180 from the first and second plates 148, 152. The body member 180, length adjustment assembly 184 and the tool 52 may pivot relative to the first and second plates 148, 152 to a desired position. During this pivoting, the coupling member 284 moves within the slots 168 defined in the first and second plates 148, 152. Once the body member 180, the length adjustment assembly 184 and the tool 52 are positioned as desired, the coupling member 284 is tightened, such as by threading, to lock or secure the body member 180, the length adjustment assembly 184 and the tool 52 relative to the first and second plates 148, 152.

Furthermore, the extent to which the tool 52 extends from the body member 180 may be adjusted by the length adjustment assembly 184. The adjustment mechanism 204 may be manipulated to selectively translate the support arm 200 out of and into the housing 192, thereby respectively extending the tool 52 further from and closer to the body member 180. The guide member 260 ensures that the support arm 200 solely translates into and out of the body member 180 and housing 192, and inhibits rotation of the support arm 200 relative to the body member 180 and the housing 192. The guide member 260 is also sufficiently rigid and durable to inhibit rotation of the support arm 200 during operation of the pipe machining apparatus 20.

The adjustable portion 220 of the body member 180 provides the ability to adjust a clearance between the second section 212 of the body member cavity 188 and the support arm 200. This ensures that the clearance between at least a portion of the body member cavity 188 and the support arm 200 is properly configured. The adjustable portion 220 may engage the support arm 200 to inhibit movement of the support arm 200 relative to the body member 180 and may be disengaged or at least loosened to allow movement of the support arm 200 relative to the body member 180. The body member 180 is also a one-piece unitarily formed member and eliminates the need for multiple components. For example, a bushing is not required because the body member 180 acts as a bushing itself.

Figure 7:
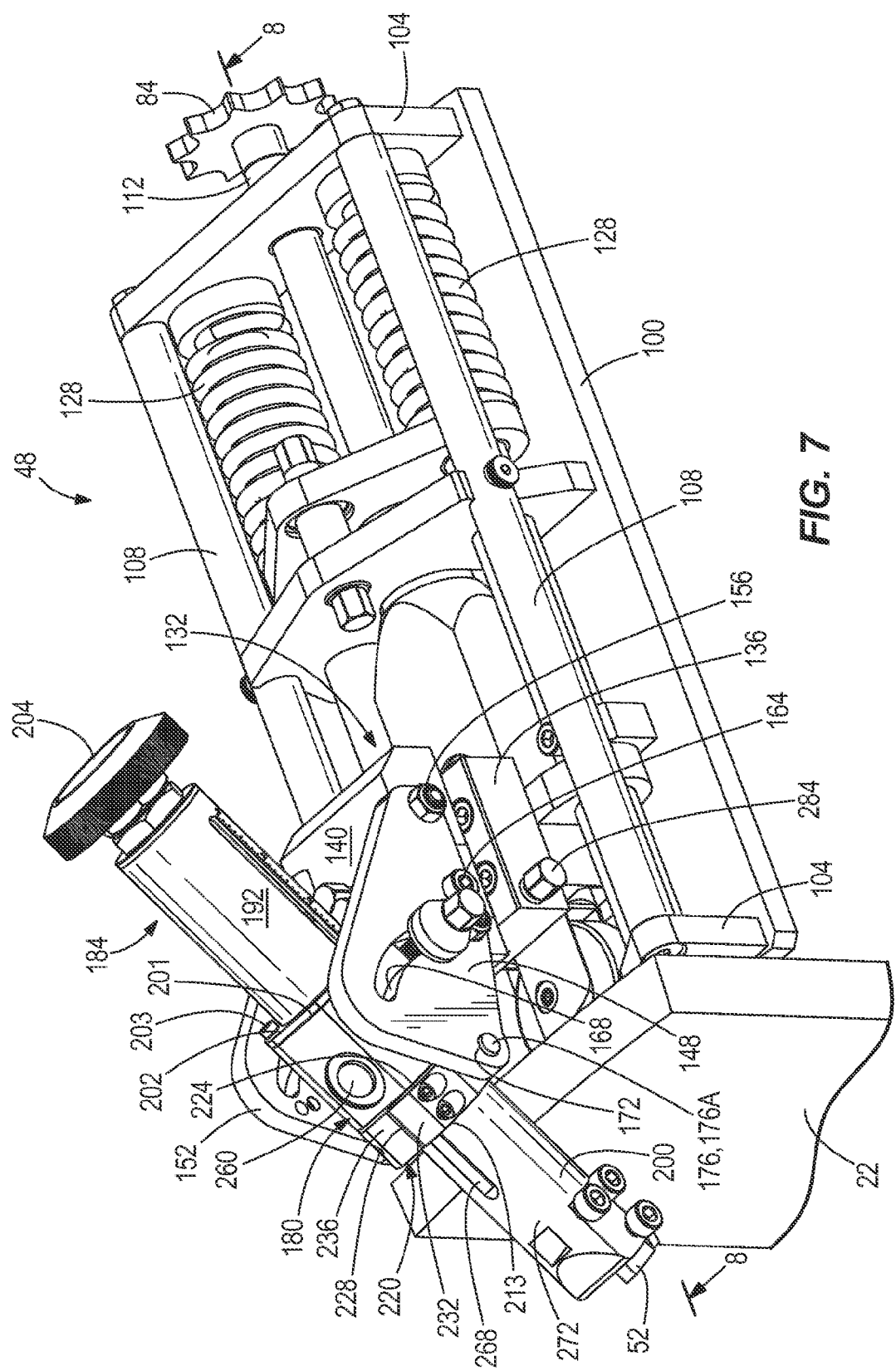
FIG. 7 is a perspective view of the tool support shown in FIG. 2 with the tool support shown in a second position, according to one aspect of the present disclosure.
Figure 8:
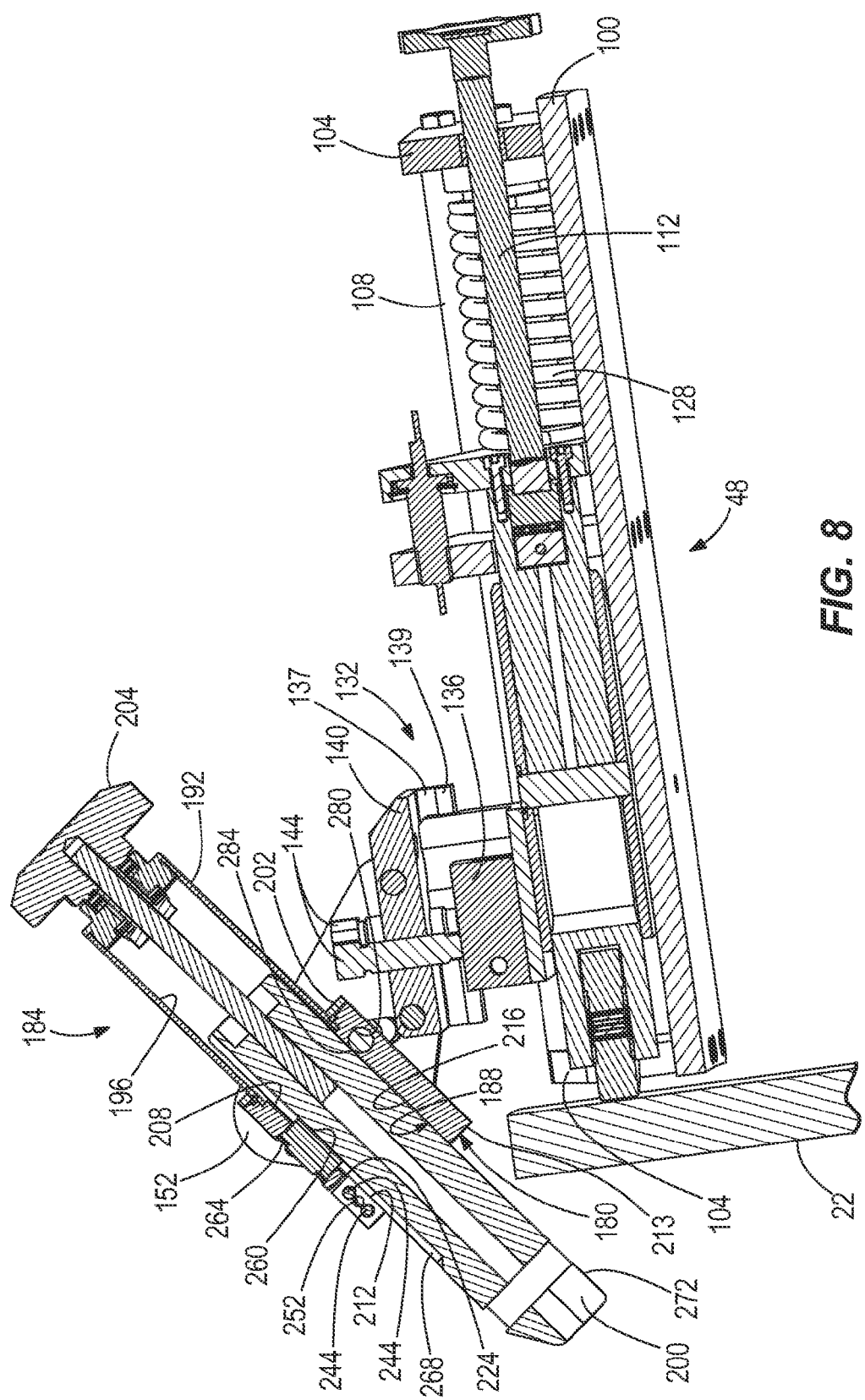
FIG. 8 is a cross-sectional view of a portion of the tool support shown in FIG. 7, according to one aspect of the present disclosure.

As demonstrated, for example, in FIGS. 7 and 8, the tool 52 may be extended a relatively great distance out from the tool support 48 (the illustrated position is only one position, the tool may actually be extended further out from the tool support). It is important to provide rigidity and strength to the tool 52 during operation of the pipe machining apparatus 20 with the tool 52 positioned at a relatively great distance from the tool support 48. The structure of the tool support 48 provides the necessary rigidity and strength to the tool 52. For example, the first and third coupling members 156, 164 are completely tightened to rigidly and securely couple the first plate 148 to the slide member 140 and the first coupling member 156 is completely tightened to rigidly and securely couple the second plate 152 to the slide member 140. The second coupling member 160 is not completely tightened in the same manner as the first coupling member 156. Rather, the second coupling member 160 is slightly loosened to act as a pin rather than as a fastener. That is, the second coupling member 160 inhibits pivoting of the first and second plates 148, 152 within a plane perpendicular to the second coupling member 160, but does not completely inhibit movement of the second plate 152 axially along the second coupling member 160. That is, the second plate 152 may be allowed to bow or deflect when the coupling member 284 is tightened to secure the body member 180 from pivoting relative to the first and second plates 148, 152. To assist with a rigid and secure support of the tool 52, the body member 180 has a slightly larger width than a width of the slide member 140. Thus, when the first and second plates 148, 152 are tightened by the coupling member 284, inner surfaces of the first and second plates 148, 152 engage surfaces of the body member 180 and compress against the body member 180. If the body member 180 had the same width or had a smaller width than the width of the slide member 140, then the body member 180 may not be as rigidly secured to the first and second plates 148, 152.

The components and associated functionalities of the tool support and the pipe machining apparatus included herein are adapted to be included in any size pipe machining apparatus to machine any size pipe and operate in the same manner, thereby providing a modularity capability to the present disclosure. That is, for example, whether the pipe machining apparatus is adapted to cut pipes of 12 inches or 120 inches, the tool support is adapted to be included in any possible size pipe machining apparatus and operate in the same manner.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the tool support and pipe machining apparatus may be utilized in any orientation and use of such terms is intended to correspond to the exemplary orientation of the tool support and pipe machining apparatus illustrated in the drawings. The use of these terms in association with the tool support and the pipe machining apparatus is not intended to limit the tool support or the pipe machining apparatus to a single orientation or to limit the tool support or the pipe machining apparatus in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, inventive subject matter lies in less than all features of a single disclosed embodiment.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A tool support for a pipe machining apparatus, the tool support comprising:
    a support arm defining a groove therein and configured to support a tool;
    a guide member at least partially positioned in the groove to allow movement of the support arm in a first direction and inhibit movement of the support arm in a second direction; and
    a body member defining a cavity that includes a first section having a fixed size and a second section having an adjustable size, wherein the body member also defines a receptacle in communication with the first section of the cavity, wherein the support arm is positioned in the cavity and moveable relative to the body member in the first direction, and wherein the guide member is at least partially positioned in the receptacle and extends into the first section of the cavity to be at least partially positioned in the groove;
    wherein the body member includes an adjustable portion configured to adjust a size of the second section of the cavity, wherein the adjustable portion is moveable to provide a first size of the second section of the cavity, in which the adjustable portion engages the support arm to secure the support arm to the body member and inhibit movement of the support arm in the first direction, and a second size of the second section of the cavity, in which the support arm is moveable relative to the body member in the first direction, wherein the second size is larger than the first size.

2. The tool support of claim 1, wherein the first direction is translation of the support arm along a longitudinal axis of the support arm and the second direction is rotation of the support arm about the longitudinal axis.

3. The tool support of claim 1, wherein the groove is V-shaped and the guide member has a complementary V-shaped.

4. The tool support of claim 1, wherein the tool support is a pivotal tool support.

5. The tool support of claim 1, wherein the guide member is moveable to adjust a depth the guide member extends into the groove.

6. The tool support of claim 5, further comprising an adjustable mechanism useable with the guide member to adjust the depth the guide member extends into the groove.

7. A tool support for a pipe machining apparatus, the tool support comprising:
   a one-piece unitarily formed body member defining a cavity there through; and
   a tool support arm at least partially positioned in the cavity and configured to translate within the cavity, wherein the tool support arm defines a groove therein;
   wherein the body member defines a receptacle in communication with the cavity, the tool support further comprising a guide member at least partially positioned in the receptacle and extending into the cavity where the guide member engages the tool support arm to allow movement of the tool support arm in a first direction and to inhibit movement of the tool support arm in a second direction different than the first direction, and further comprising an adjustable mechanism useable with the guide member to adjust the guide member relative to the receptacle and the groove.

8. The tool support of claim 7, wherein the tool support is a pivotal tool support.

9. The tool support of claim 7, wherein the body member includes an adjustable portion configured to adjust a size of the cavity.

10. The tool support of claim 7, wherein the cavity includes a first section and a second section, wherein the first section has a fixed size and the second section has an adjustable size.

11. The tool support of claim 10, wherein the body member includes an adjustable portion configured to adjust a size of the second section of the cavity.

12. The tool support of claim 11, wherein the adjustable portion includes a first resilient member and a second resilient member selectively moveable relative to one another to adjust the size of the second section of the cavity.

13. The tool support of claim 12, further comprising a first member configured to move the first resilient member and the second resilient member toward one another to reduce the size of the second section of the cavity and a second member configured to move the first resilient member and the second resilient member away from one another to increase the size of the second section of the cavity.

14. A tool support for a pipe machining apparatus, the tool support comprising:
   a first translating member configured to linearly translate a tool toward a pipe in a linear direction; and
   a second translating member configured to linearly translate the tool toward the pipe in the same linear direction as the first translating member, wherein the second translating member is coupled to and moveable relative to the first translating member.

15. The tool support of claim 14, further comprising:
   a locking member configured to selectively secure the first and second translating members to one another to selectively inhibit or allow movement of the second translating member relative to the first translating member; and
   an engagement member coupled to the first translating member to translate the first translating member relative to the pipe.

16. The tool support of claim 14, wherein the first translating member is configured to translate a tool during a machining operation of the pipe machining apparatus and the second translating member is configured to translate a tool at least one of prior to or subsequent to a machining operation.

17. A tool support for a pipe machining apparatus, the tool support comprising:
   a first translating member configured to translate a tool toward and away from a pipe;
   a second translating member configured to translate the tool toward and away from the pipe, wherein the second translating member is coupled to and translatable relative to the first translating member; and
   a locking member that selectively rigidly secures the second translating member to the first translating member, wherein the locking member is moveable between a first position, in which the first and second translating members are rigidly secured together and are not moveable relative to each other, and a second position, in which the first and second translating members are translatable relative to each other.

* * * * *